(12) United States Patent
Duan et al.

(10) Patent No.: US 8,174,783 B2
(45) Date of Patent: May 8, 2012

(54) TESTING MAGNETIC DISK PERFORMANCE WITH A SINGLE SLIDER SIMULATING SLIDERS OF VARIOUS DISK DRIVE SYSTEMS

(75) Inventors: Shanlin Duan, Fremont, CA (US); Zhen Jin, Fremont, CA (US); Jane Jie Zhang, San Jose, CA (US); Kezhao Zhang, Fremont, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 158 days.

(21) Appl. No.: 12/508,363

(22) Filed: Jul. 23, 2009

(65) Prior Publication Data

US 2011/0019298 A1 Jan. 27, 2011

(51) Int. Cl.
*G11B 27/36* (2006.01)
(52) U.S. Cl. .......................................... 360/31
(58) Field of Classification Search ........................ None
See application file for complete search history.

(56) References Cited

U.S. PATENT DOCUMENTS

| | | | |
|---|---|---|---|
| 5,792,947 A | 8/1998 | Pogrebinsky et al. | |
| 5,863,237 A * | 1/1999 | Felts et al. ...................... | 451/41 |
| 6,105,421 A | 8/2000 | Yao et al. | |
| 6,563,673 B2 * | 5/2003 | Mundt et al. .................. | 360/135 |
| 6,577,466 B2 | 6/2003 | Meyer | |
| 6,735,027 B2 | 5/2004 | Helsel et al. | |
| 7,124,625 B1 | 10/2006 | Kurita et al. | |
| 2003/0026018 A1* | 2/2003 | Forehand ....................... | 360/31 |
| 2008/0007871 A1 | 1/2008 | Kiyono | |
| 2008/0072692 A1 | 3/2008 | Uji et al. | |
| 2008/0259480 A1* | 10/2008 | Pham et al. ..................... | 360/25 |

FOREIGN PATENT DOCUMENTS

| | | |
|---|---|---|
| JP | 1-98101 A | 4/1989 |
| JP | 1-100482 A | 4/1989 |
| JP | 5-250643 A | 9/1993 |
| JP | 10-172101 A | 8/1998 |
| JP | 11-260014 A | 9/1999 |
| JP | 2002056527 A | 2/2002 |

OTHER PUBLICATIONS

Lin et al.; "Experimental Studies of Nonlinearities in High Density Disk Recording," IIE Transactions on Magnetic, vol. 28, No. 5, Sep. 2002, pp. 3279-3281.

* cited by examiner

*Primary Examiner* — Daniell L Negron
(74) *Attorney, Agent, or Firm* — Duft Bornsen & Fishman, LLP

(57) ABSTRACT

Magnetic disk drive systems and associated methods are described for testing magnetic disk performance for certification with a plurality of magnetic disk drive systems prior to installation. The test system may position a slider at a first spacing between the magnetic disk in the slider and simulate the recording performance of a disk drive system with the magnetic disk at the first spacing. The disk drive test system may then transfer a control signal to a heating element in the slider to move the slider to a different spacing between the magnetic disk and the slider to simulate the recording performance of another disk drive system. The test system may, thus, use a single slider to certify a magnetic disk with a plurality of disk drive systems.

20 Claims, 6 Drawing Sheets

| TFC Power (mW) | Disk 1 | Disk 2 | Difference: Disk1 - Disk 2 |
|---|---|---|---|
| 5.8 | -2.2 | -1.8 | -0.4 |
| 13.1 | -2.5 | -2.1 | -0.4 |
| 20.5 | -2.9 | -2.6 | -0.2 |
| 36.4 | -3.7 | -3.4 | -0.3 |
| 52.4 | -4.4 | -4.4 | 0.0 |
| 61.5 | -4.6 | -4.8 | 0.2 |
| 71.3 | -5.2 | -4.8 | -0.4 |
| Average | -3.6 | -3.4 | -0.2 |

| Head # | Disk 1 | Disk 2 | Difference: Disk1 - Disk 2 |
|---|---|---|---|
| 1 | -5.9 | -5.9 | 0.0 |
| 2 | -5.5 | -6.7 | 1.2 |
| 3 | -6.2 | -4.9 | -1.3 |
| 4 | -5.7 | -5.4 | -0.3 |
| 5 | -5.8 | -5.3 | -0.4 |
| 6 | -5.7 | -5.4 | -0.3 |
| Average | -5.8 | -5.6 | -0.2 |

FIG. 10

TESTING MAGNETIC DISK PERFORMANCE WITH A SINGLE SLIDER SIMULATING SLIDERS OF VARIOUS DISK DRIVE SYSTEMS

BACKGROUND OF THE INVENTION

1. Field of the Invention

The invention relates to the field of magnetic disk drive systems and, in particular, to testing performance of a magnetic disk prior to installation in a disk drive system.

2. Statement of the Problem

Many computer systems use magnetic disk drives for mass storage of information. Magnetic disk drives typically include one or more sliders that include read and write heads. An actuator/suspension arm holds the slider above a magnetic disk. When the magnetic disk rotates, an air flow generated by the rotation of the magnetic disk causes an air bearing surface (ABS) side of the slider to fly a particular height above the magnetic disk. The height at which the slider flies depends on the shape of the ABS. As the slider flies on the air bearing, a voice coil motor (VCM) moves the actuator/suspension arm to position the read head and the write head over selected tracks of the magnetic disk.

The magnetic disk includes data regions and servo regions. The servo regions are used to provide sector information, timing information, positioning information, etc. For example, as the magnetic disk makes a revolution, the read head passes over burst fields in the servo regions. The signal read from the burst fields may be used to generate a timing signal. The signal read from the burst fields may also be used to generate a quadrature signal that is used for centering the read head and write head over the center of a track. The information read from the servo regions may be generally referred to as servo data. The servo data is feed back to a control system, which controls the VCM, the rotational speed of the magnetic disk, etc.

One factor that contributes to the effective reading and writing by the slider is the spacing of the read/write heads in relation to the surface of the magnetic disk. The spacing between the read/write heads generally depends on the fly height of the slider, which is determined by the ABS of the slider. As areal densities of magnetic disks increase, it becomes more important to precisely control spacing of the read/write heads in relation to the magnetic disk, as the spacing may be 10 nanometers or less.

To assist in the spacing between the read/write heads and the magnetic disk, some sliders include heating elements that are fabricated proximate to the read/write heads. The read/write heads are fabricated from materials that have a different thermal rate of expansion than the body of the slider. Thus, when an electrical current is applied to the heating elements, the read/write heads protrude from the ABS of the slider. The protrusion causes the read/write heads to extend toward the surface of the magnetic disk, thereby reducing the spacing between the read/write heads and the magnetic disk. The use of heating elements (sometimes referred to as Thermal Fly-Height Control) allows for more precise spacing between the read/write heads and the magnetic disk.

Before being installed in a disk drive, however, magnetic disks are tested to ensure their operability within various disk drives. Generally, the magnetic disks are manufactured in batches and a portion of each batch is tested to evaluate the performance of the magnetic disks before being installed within the disk drives. A test bed simulates operating conditions for the magnetic disks within a disk drive by reading from and writing to the magnetic disks with a slider. Accurate testing is important because it determines whether a batch of disks will meet the specifications of a particular disk drive selected for magnetic disk installation.

Different disk drives, however, may have different sliders with different characteristics (e.g., soft error rates, signal to noise ratios, magnetic track widths, etc.). Accordingly, magnetic disks are tested to determine whether they are suitable for a particular disk drive. The testing also provides a direction for future magnetic disk development. In addition to having accurate magnetic disk testing, it is generally desirable to test the magnetic disks in a relatively rapid manner so as to be more integral to the assembly process (e.g., improved availability of sputtering tools). Accuracy and speed of magnetic disk testing are generally competing interests. For example, due to the large number of magnetic disks in a developed batch, the test bed is usually configured with a single slider to rapidly test the magnetic disks. However, results of a particular magnetic disk may vary from test to test. To address these variations, multiple tests are usually performed with the single slider and the results are then averaged out to provide a statistical recording characteristic of the magnetic disk batch. Even so, the magnetic disk tests are generally slider dependent. Thus, when a magnetic disk is installed, a disk drive configured with a different slider may perform differently than the test bed. These problems may be overcome by using multiple sliders in the test bed, but this generally consumes more time due to the delicate swapping in and out of sliders for different disk drive simulations. Accordingly, there is a need for improved testing that is both accurate and relatively quick.

SUMMARY

Embodiments herein provide relatively accurate and quick testing of magnetic disks to characterize magnetic disk performance in a magnetic disk drive system prior to installation. In doing so, a disk drive test system may simulate sliders of various disk drive systems using a single slider by varying the Thermal Fly-Height Control.

In one embodiment, a method of testing recording performance of a magnetic disk includes configuring the magnetic disk within a test system, spinning the magnetic disk, and positioning a slider proximate to the magnetic disk. The method also includes transferring a first control signal to a heating element in the slider to provide a first spacing between the slider and the magnetic disk and simulating recording performance of a first disk drive system with the magnetic disk at the first spacing to certify the magnetic disk for installation with the first disk drive system. The method also includes transferring a second control signal to the heating element in the slider to provide a second spacing between the slider and the magnetic disk, wherein the first and second spacings are different and simulating recording performance of a second disk drive system with the magnetic disk at the second spacing to certify the magnetic disk for installation with the second disk drive system.

The method may also include measuring soft error rates of the magnetic disk at the first and second spacings. Sliders of the first and second disk drive systems may be different (e.g., the sliders may have different magnetic core widths, signal to noise ratio characteristics, soft error rates, etc.).

The method may further include transferring a third control signal to the heating element in the slider to provide a third spacing between the slider and the magnetic disk, wherein the third spacing differs from the first and second spacings and simulating the recording performance of a third disk drive system with the magnetic disk at the third spacing to certify the magnetic disk for installation with the third disk drive system. Transferring the control signals may include increasing an electrical current to the heating element to resistively heat the heating element and change the spacings between the slider and the magnetic disk.

In another embodiment, a test system is operable to test recording performance of a magnetic disk for certification with a plurality of disk drive systems. The test system includes a controller and an actuator configured with a slider that includes a read head, a write head, and a heating element. The actuator is operable to suspend the slider above the magnetic disk and wherein the slider is operable to access digital data stored on the magnetic disk via the read and write heads. The controller is operable to transfer a first control signal to the heating element to provide a first spacing between the slider and the magnetic disk. The controller is further operable to transfer a second control signal to the heating element to change from the first spacing to a second spacing between the slider and the magnetic disk. The controller is further operable to simulate the recording performances of first and second disk drive systems with the magnetic disk based on the first and second spacings to certify the magnetic disk for installation with the first and the second disk drive systems.

In another embodiment, a magnetic disk testing software product operable within a test system to test recording performance of a magnetic disk for a plurality of disk drive systems, the software product includes instructions to direct a controller of the test system to spin the magnetic disk, position a slider proximate to the magnetic disk, transfer a first control signal to a heating element in the slider to provide a first spacing between the slider and the magnetic disk, and simulate recording performance of a first disk drive system with the magnetic disk at the first spacing to certify the magnetic disk for installation with the first disk drive system. The instructions also direct the controller to transfer a second control signal to the heating element in the slider to provide a second spacing between the slider and the magnetic disk. The first and second spacings are different and simulate recording performance of a second disk drive system with the magnetic disk at the second spacing to certify the magnetic disk for installation with the second disk drive system.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE INVENTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below, but by the claims and their equivalents.

Figure 1:
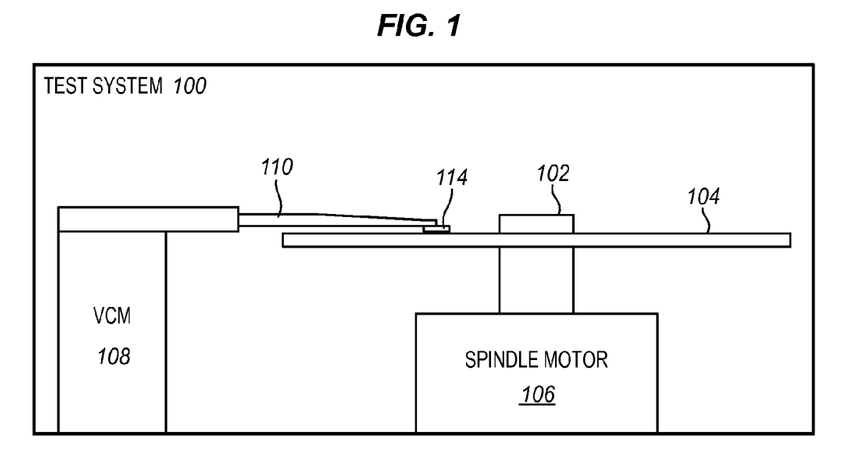
FIG. 1 illustrates a magnetic disk drive test system in one exemplary embodiment.

FIG. 1 illustrates a test system 100 for magnetic disks in one exemplary embodiment. The test system 100 in many ways operates as a typical disk drive system in that the test system 100 writes to and reads from a magnetic disk 104. The test system 100 evaluates the performance of the read and write operations to determine operability of the magnetic disk 104 with various disk drive systems. The test system 100 includes a spindle 102 that supports a magnetic disk 104. The spindle 102 is connected to a spindle motor 106 that is adapted to rotate the spindle 102 responsive to a motor current in order to rotate the magnetic disk 104. The test system 100 further includes an actuator/suspension arm 110 that supports a slider 114 over the surface of the magnetic disk 104. The actuator/suspension arm 110 is connected to a VCM 108 that is adapted to pivot the actuator/suspension arm 110 responsive to a VCM current in order to position the slider 114 over desired tracks of the magnetic disk 104. The test system 100 may include other devices, components, or systems not shown in FIG. 1.

Figure 2:
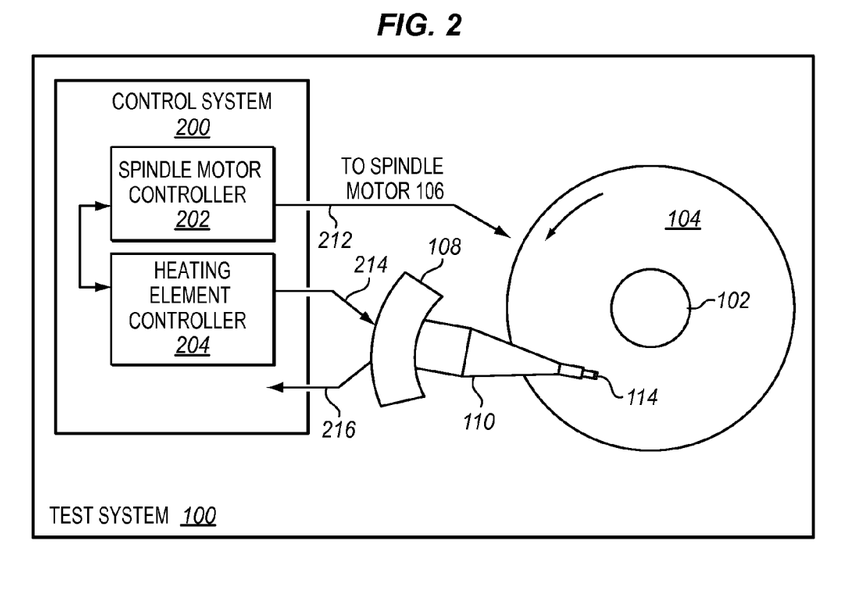
FIG. 2 is a top view of the magnetic disk drive test system in one exemplary embodiment.

FIG. 2 is a top view of the test system 100 in an exemplary embodiment. In this view, the test system 100 further includes a control system 200. The control system 200 includes a spindle motor controller 202 that is adapted to apply a motor current 212 to the spindle motor 106, which controls the rotational speed of the magnetic disk 104. The control system 200 further includes a heating element controller 204 that is adapted to apply a heating power 214 to the heating elements (not shown) in the slider 114 in order to control the amount of protrusion of the read/write heads.

When the magnetic disk 104 rotates, an air flow generated by the rotation of the magnetic disk 104 causes an ABS of the slider 114 to fly on a cushion of air (e.g., an air bearing) at a particular height above the magnetic disk 104. As the slider 114 flies over the surface of the magnetic disk 104, the VCM 108 (see FIG. 1) moves the actuator/suspension arm 110 to position a read head (not shown) and a write head (not shown) of the slider 114 over selected tracks of the magnetic disk 104.

Although the test system 100 is shown and described as having the VCM 108 controlling the actuator/suspension arm 110, the invention is not intended to be so limited as other types of motorized control may be used. For example, the test system 100, in one embodiment, employs X-axis and Y-axis linear motors that simulate the VCM 108 rotary movement. One such system is the V2002 Spinstand produced by Guzik Technical Enterprises of Mountain View, Calif.

Figure 3:
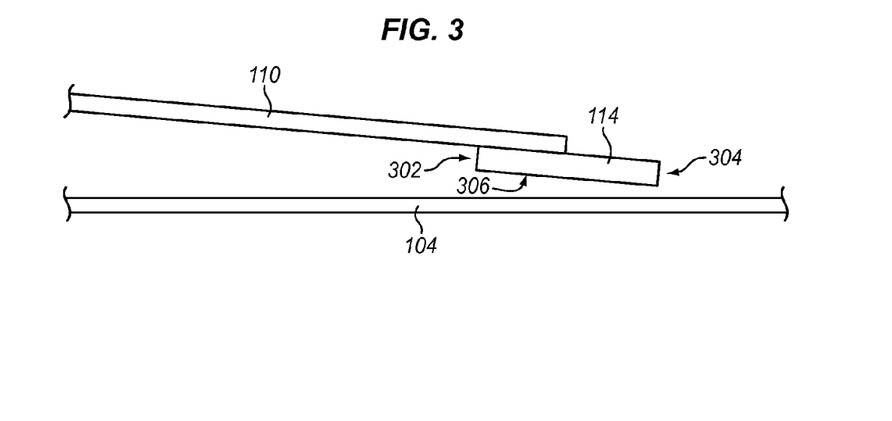
FIG. 3 is a side view of the magnetic disk drive test system in one exemplary embodiment.

FIG. 3 is a side view of the test system 100 in an exemplary embodiment. The slider 114 is supported above the surface of the magnetic disk 104 by actuator/suspension arm 110. The slider 114 includes a front end 302 and an opposing trailing end 304. The slider 114 also includes an ABS 306 that faces toward the surface of the magnetic disk 104. A read head (not shown) and a write head (not shown) are formed proximate to the trailing end 304 of the slider 114. The slider 114 also includes one or more heating elements that are fabricated in the slider 114 proximate to the read/write heads. The read/write heads are fabricated from materials that have a different thermal rate of expansion than the body of slider 114. Thus, when a heating current is applied to the heating elements, the read/write heads protrude from the ABS 306 of the slider 114. Thus, the protrusion causes the read/write heads to extend toward the surface of the magnetic disk 104, which reduces the spacing between the read/write heads and magnetic disk 104. The use of heating elements (sometimes referred to as Thermal Fly-Height Control) allows for more precise spacing between the read/write heads and magnetic disk 104.

Figure 4:
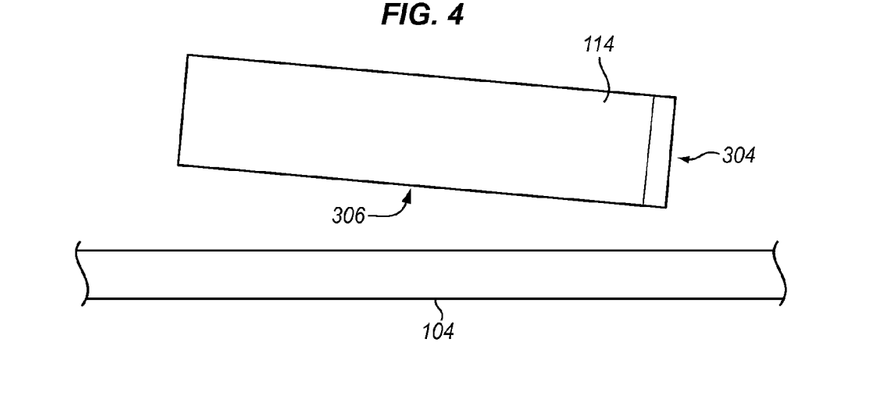
FIGS. 4-5 are side views of a slider in relation to a magnetic disk in one exemplary embodiment.
Figure 5:
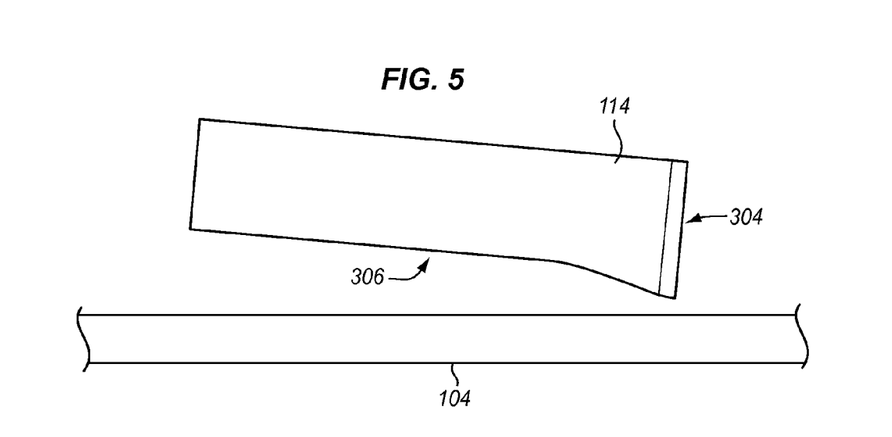

FIG. 4 is a side view of the slider 114 in relation to the magnetic disk 104. When no heating power is applied to the heating element in the slider 114, the spacing between read/write heads and the magnetic disk 104 is defined by the fly height of slider 114. When heating power is applied, the heating elements cause the read/write heads to protrude from the ABS 306 toward the surface of the magnetic disk 104. FIG. 5 is another side view of the slider 114 in relation to the magnetic disk 104. Due to the protrusion of the read/write heads, the spacing between the read/write heads and the surface of the magnetic disk 104 is reduced. Thus, the spacing can be controlled by the amount of heating power applied to the heating elements.

Figure 6:
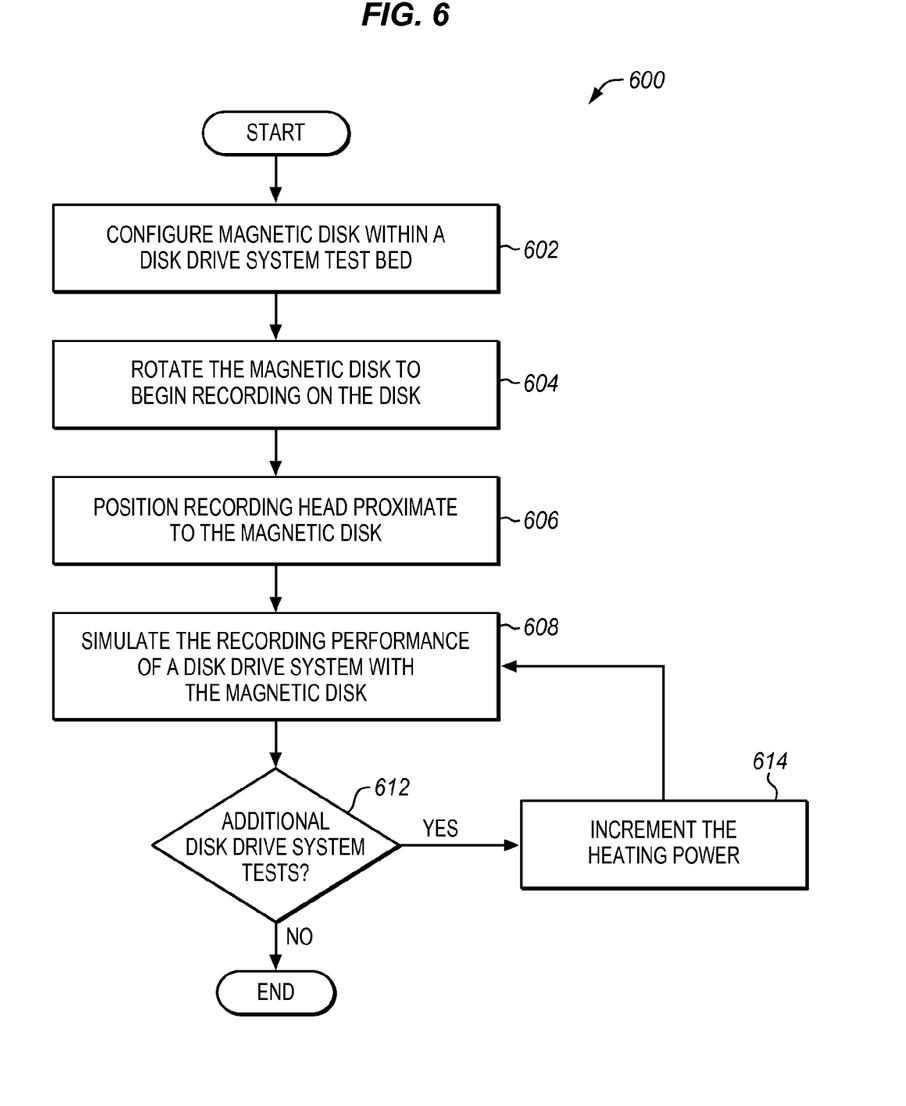
FIG. 6 is a flow chart illustrating a method of characterizing the recording performance of a magnetic disk in one exemplary embodiment.

As mentioned, before the magnetic disk 104 is put into a disk drive system for operation, it is usually tested to determine its operability therewith. FIG. 6 is a flow chart illustrating a method 600 of characterizing the recording performance of a magnetic disk in one exemplary embodiment. The method 600 will be discussed in relation to the test system 100 shown in FIGS. 1-5. The steps of the flow chart in FIG. 6 are not all inclusive and may include other steps not shown.

Once a batch of magnetic disks have been developed for installation with disk drives systems, one or more of those disks may be tested to ensure its performance with a disk drive. Accordingly, the magnetic disk 104 is configured within the test system 100 in step 602. As mentioned, the test system 100 operates similarly to a typical disk drive system to evaluate the recording characteristics of the magnetic disk 104. In this regard, the spindle motor controller 202 applies a motor current 212 to the spindle motor 106 (see also FIGS. 1-2). Responsive to the motor current 212, the spindle motor 106 rotates the spindle 102 which in turn rotates the magnetic disk 104 at a desired rotational speed (RPM) in step 604. In step 606, the VCM 108 (or other control) pivots the actuator/suspension arm 110 to position the slider 114 over tracks of the magnetic disk 104 with a first spacing between the slider 114 and the magnetic disk 104. Such may include transferring a control signal from the heating element controller 204 to the heating element of the slider 114. For example, the first spacing between the read/write heads may be due to the protrusion of the read/write heads caused by the heating element controller 204 increasing the temperature in the heating element.

Once positioned over the magnetic disk 104, the read and write heads may read from and write to the magnetic disk 104 to simulate the recording performance of the magnetic disk 104 (e.g., using test data) with respect to a particular disk drive system in step 608. For example, the spacing between the slider 114 and the magnetic disk 104 may provide a recording performance that is representative of a particular disk drive system. Thus, the recording performance of the magnetic disk 104 with the slider 114 in this first spacing may correlate to a particular disk drive system with a particular slider. If the recording performance of the magnetic disk 104 meets the recording specifications of that disk drive system, then the batch of magnetic disks may be certified for installation with that type of disk drive system. If there are other disk drive systems in which the magnetic disk are to be installed, then another test may be performed to determine whether the magnetic disk 104 meets the specifications of those disk drive system as well. Accordingly, in step 612, a determination is made as to whether additional disk drive tests are to be performed. If so, the test system 100 may direct the heating element controller 204 to generate a control signal that conducts a current to the heating element in the slider 114 in step 614. This causes the heating element to warm up through resistive heating and cause an expansion of the read and write heads of the slider 114. This expansion, as mentioned, causes the read and write heads of the slider 114 to protrude from the slider 114, thereby changing the spacing between the slider 114 and the magnetic disk 104. In this next spacing, the recording performance of the next disk drive system with the magnetic disk 104 is again simulated in step 608. This process continues until there are no other disk drive systems for which to test the magnetic disk 104. Thus, the test system 100 is capable of certifying the magnetic disk 104 for installation within a plurality of disk drive systems by using a single slider.

Figure 7:
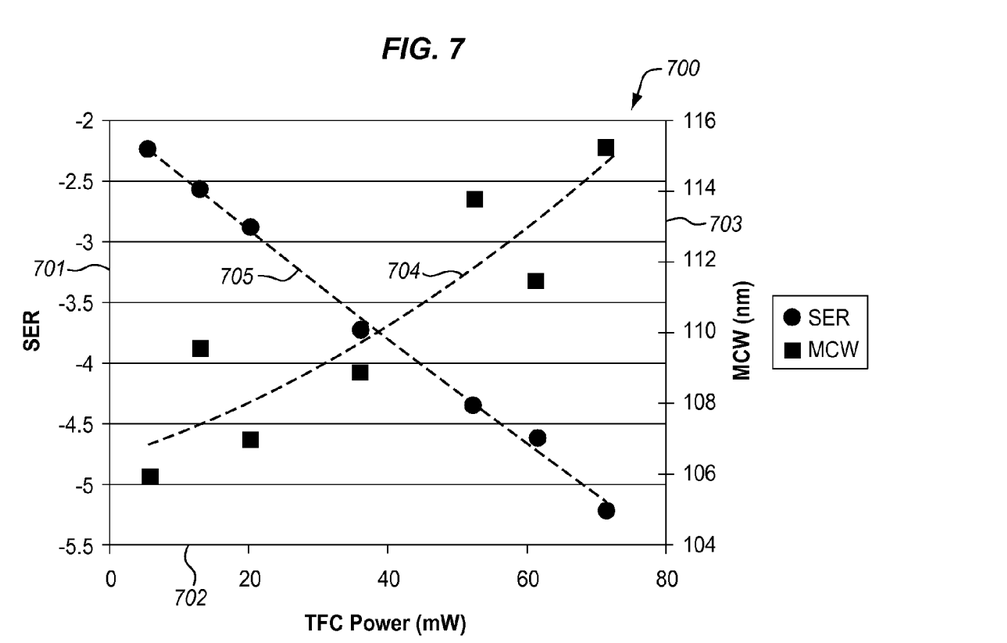
FIG. 7 includes a graph illustrating controllable recording performance measurements using Thermal Fly-Height Control.

FIG. 7 includes a graph 700 illustrating controllable recording performance measurements using Thermal Fly-Height Control. The graph 700 illustrates the soft error rate (SER; axis 701) versus the Thermal Fly-Height Control power applied to the heating element of the slider 114 in milliwatts (axis 702). The graph 700 also illustrates correlated magnetic core widths of recording heads for actual disk drive systems (axis 703) versus the Thermal Fly-Height Control power applied to the heating element of the slider 114. As can be seen in the graph 700, the soft error rate decreases almost linearly for increased power (and thus heat) to the heating element (illustrated with the points along the line 705). While not as linear as the soft error rate, the magnetic core widths of various recording heads may be similarly represented with incremental changes to the Thermal Fly-Height Control power. For example, increased Thermal Fly-Height Control power almost linearly corresponds to increased magnetic core widths (illustrated with the points along the line 704). Thus, the graph 700 shows that the recording performance and magnetic core width of a recording head may be simulated via the Thermal Fly-Height Control.

Figure 8:
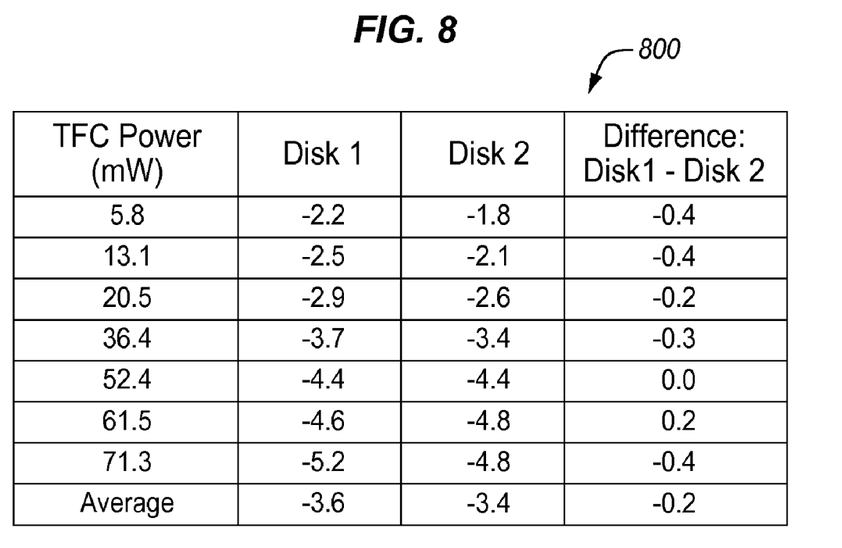
FIG. 8 includes a table illustrating magnetic recording performance in one exemplary embodiment.
Figure 9:
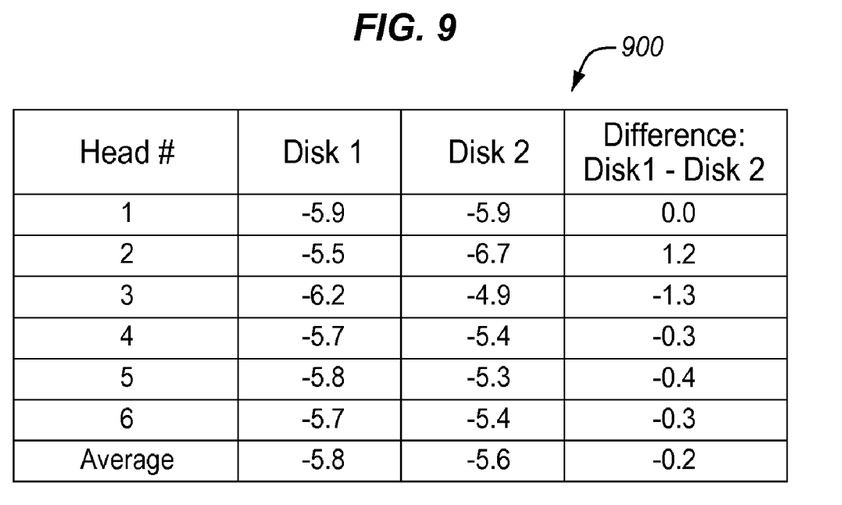
FIG. 9 includes a table illustrating magnetic recording performance of prior art magnetic disk testing.

FIG. 8 includes a table 800 illustrating magnetic recording performance in one exemplary embodiment. FIG. 9, on the other hand, includes a table 900 illustrating magnetic recording performance of prior art magnetic disk testing using multiple sliders. Each of the tests was performed on two separate magnetic disks to illustrate the test to test differences in soft error rates and how the soft error rates are slider dependent. The SER reflects the quality of a disk drive system and/or its components. A lower SER translates to better performance. To measure the SER, a series of bits are written to the magnetic disk 104 and then read back. Some of the bits that are read back are incorrect due to noise. The ratio of number of incorrect bits that are read back to the total number of bits is the SER. The SER is represented by the logarithm of its value based on 10 (i.e., Log 10). For example, if there is one incorrect bit in 10,000 bits, the SER is $10^{-4}$, or −4 after converting to the log. Thus, the SER values in the tables 800 and 900 are the logarithms of the SER.

In this regard, the tables 800 and 900 show two magnetic disks (columns "Disk 1" and "Disk 2") that were tested with a different recording head characteristics. More specifically, the table 800 shows how the recording head characteristics are changed according to Thermal Fly-Height Control changes whereas the table 900 shows how the recording head characteristics are changed via the actual swap of physical sliders. In each table, the soft error rate difference was measured for each of the disks for each Thermal Fly-Height Control (i.e., table 800) and each actual slider (i.e., table 900). The difference between the disk to disk soft error rates was determined and an average soft error rate was computed therefrom. As can be seen in the tables 800 and 900, the average soft error rates were the same. Thus, the exemplary testing herein provides similar results to the prior art testing. However, many advantages of the exemplary magnetic disk testing over the prior art exists. For example, slider dependence and test variability can be addressed because this form of single slider testing is generally more reliable than the conventional single slider testing due to the controllable recording performance variations of multiple fly heights. Also, since a single head may be used, there is a shorter testing time due to the elimination of inspection, handling, installation, and cleaning of multiple sliders. The fly height can also be adjusted during read and/or write operations resulting in varied combinations of read and write conditions than can be performed with multiple sliders. This is particularly advantageous when the supply of sliders is limited as in the early stages of disk drive product development. Since multiple sliders may be simulated through the thermal fly height control, the embodiments described herein may also be controlled via software. For example, the heating element controller 204 may be programmed to generate control signals that heat the heating elements of the slider in a predetermined manner. That is, each Thermal Fly-Height Control power increment used to simulate a particular slider may be generated according to software instructions to test the magnetic disk 104 as desired.

Figure 10:
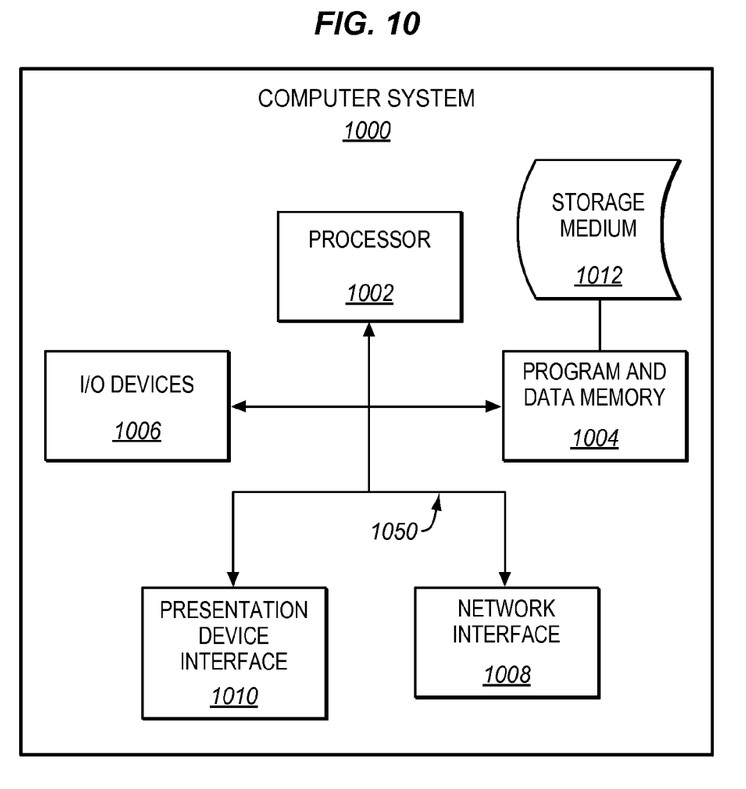
FIG. 10 is a block diagram depicting a computer system operable to provide features and aspects hereof by executing programmed instructions and accessing data stored on a computer readable storage medium.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 10 is a block diagram depicting a computer system 1000 operable to provide features and aspects hereof by executing programmed instructions and accessing data stored on a computer readable storage medium 1012. For example, the computer system 1000 may be used to implement the control system 200 of the test system 100.

Furthermore, embodiments of the invention can take the form of a computer program product accessible from a computer-usable or computer-readable medium 1012 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 1000 suitable for storing and/or executing program code will include at least one processor 1002 coupled directly or indirectly to memory elements 1004 through a system bus 1050. The memory elements 1004 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 1006 (including but not limited to keyboards, displays, pointing devices, etc) can be coupled to the system either directly or through intervening I/O control systems. Network adapter interfaces 1008 may also be coupled to the system to enable the computer system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1010 may be coupled to the system to interface to one or more presentation device such as printing systems and displays for presentation of presentation data generated by processor 1002.

Although specific embodiments were described herein, the scope of the invention is not limited to those specific embodiments. The scope of the invention is defined by the following claims and any equivalents thereof.

We claim:

1. A test system operable to test recording performance of a magnetic disk for certification with a plurality of disk drive systems, the test system comprising:
   a controller; and
   an actuator configured with a slider that includes a read head, a write head, and a heating element, wherein the actuator is operable to suspend the slider above the magnetic disk and wherein the slider is operable to access digital data stored on the magnetic disk via the read and write heads,
   wherein the controller is operable to transfer a first control signal to the heating element to provide a first spacing between the slider and the magnetic disk,
   wherein the controller is further operable to transfer a second control signal to the heating element to change from the first spacing to a second spacing between the slider and the magnetic disk, and
   wherein the controller is further operable to simulate the recording performances of first and second disk drive systems with the magnetic disk based on the first and second spacings to certify the magnetic disk for installation with the first and the second disk drive systems.

2. The test system of claim 1, wherein sliders of the first and second disk drive systems are different.

3. The test system of claim 1, wherein the control signals comprise an electrical current operable to heat the heating element via resistance heating.

4. The test system of claim 1, wherein the recording performances include soft error rates associated with the first and second spacings.

5. The test system of claim 1, wherein sliders of the first and second disk drive systems have different magnetic core widths.

6. The test system of claim 1, wherein sliders of the first and second disk drive systems have different signal to noise ratio characteristics.

7. The test system of claim 1, wherein the controller is further operable to transfer a third control signal to the heating element to change from the second spacing to a third spacing between the slider and the magnetic disk,
   wherein the third spacing differs from the first and second spacings, and
   wherein the controller is further operable to simulate a recording performance of a third disk drive system based on the third spacing to certify the magnetic disk for third disk drive system.

8. A method of testing recording performance of a magnetic disk, the method comprising:
   configuring the magnetic disk within a test system;
   spinning the magnetic disk;
   positioning a slider proximate to the magnetic disk,
   transferring a first control signal to a heating element in the slider to provide a first spacing between the slider and the magnetic disk;
   simulating recording performance of a first disk drive system with the magnetic disk at the first spacing to certify the magnetic disk for installation with the first disk drive system;
   transferring a second control signal to the heating element in the slider to provide a second spacing between the slider and the magnetic disk, wherein the first and second spacings are different; and
   simulating recording performance of a second disk drive system with the magnetic disk at the second spacing to certify the magnetic disk for installation with the second disk drive system.

9. The method of claim 8, further comprising measuring soft error rates of the magnetic disk at the first and second spacings.

10. The method of claim 8, wherein sliders of the first and second disk drive systems have different magnetic core widths.

11. The method of claim 8, wherein sliders of the first and second disk drive systems have different signal to noise ratio characteristics.

12. The method of claim 8, wherein sliders of the first and second disk drive systems are different.

13. The method of claim 8, further comprising:
   transferring a third control signal to the heating element in the slider to provide a third spacing between the slider and the magnetic disk, wherein the third spacing differs from the first and second spacings; and
   simulating the recording performance of a third disk drive system with the magnetic disk at the third spacing to certify the magnetic disk for installation with the third disk drive system.

14. The method of claim 8, wherein transferring the control signals comprises increasing an electrical current to the heating element to resistively heat the heating element and change the spacings between the slider and the magnetic disk.

15. A magnetic disk testing software product operable within a test system to test recording performance of a magnetic disk for a plurality of disk drive systems, the software product configured on a non-transitory computer-readable medium and comprising instructions to direct a controller of the test system to:
   spin the magnetic disk;
   position a slider proximate to the magnetic disk,
   transfer a first control signal to a heating element in the slider to provide a first spacing between the slider and the magnetic disk;
   simulate recording performance of a first disk drive system with the magnetic disk at the first spacing to certify the magnetic disk for installation with the first disk drive system;
   transfer a second control signal to the heating element in the slider to provide a second spacing between the slider and the magnetic disk, wherein the first and second spacings are different; and
   simulate recording performance of a second disk drive system with the magnetic disk at the second spacing to certify the magnetic disk for installation with the second disk drive system.

16. The software product of claim 15, further comprising instructions to direct the controller of the test system to measure soft error rates of the magnetic disk at the first and second spacings.

17. The software product of claim 15, wherein sliders of the first and second disk drive systems have different magnetic core widths.

18. The software product of claim 15, wherein sliders of the first and second disk drive systems have different signal to noise ratio characteristics.

19. The software product of claim 15, further comprising instructions to direct the controller of the test system to:
   transfer a third control signal to the heating element in the slider to provide a third spacing between the slider and the magnetic disk, wherein the third spacing differs from the first and second spacings; and
   simulate the recording performance of a third disk drive system with the magnetic disk at the third spacing to certify the magnetic disk for installation with the third disk drive system.

20. The software product of claim 15, further comprising instructions to direct the controller of the test system to increase an electrical current to the heating element to resistively heat the heating element and change the spacings between the slider and the magnetic disk.

* * * * *